United States Patent [19]
Yuuki

[11] Patent Number: 5,268,980
[45] Date of Patent: Dec. 7, 1993

[54] ACTIVE OPTICAL COUPLER FOR OPTICAL DATA LINK COMMUNICATION SYSTEM

[75] Inventor: Hayato Yuuki, Suzuka, Japan

[73] Assignee: Sumitomo Wiring Systems, Ltd., Mie, Japan

[21] Appl. No.: 898,716

[22] Filed: Jun. 15, 1992

[30] Foreign Application Priority Data

Jun. 14, 1991 [JP] Japan .................................. 3-170481
Nov. 28, 1991 [JP] Japan .................................. 3-340357

[51] Int. Cl.$^5$ .................................................. G02B 6/28
[52] U.S. Cl. ........................................ 385/46; 385/42; 385/47
[58] Field of Search .................... 385/46, 42, 43, 44, 385/45, 47, 20

[56] References Cited

U.S. PATENT DOCUMENTS

| | | | |
|---|---|---|---|
| 4,616,898 | 10/1986 | Hicks, Jr. | 385/24 |
| 5,074,634 | 12/1991 | Takahashi | 385/24 X |
| 5,140,655 | 8/1992 | Bergmann | 385/46 |

FOREIGN PATENT DOCUMENTS

| | | | |
|---|---|---|---|
| 63-316810 | 12/1988 | Japan . | |
| 0277030 | 11/1990 | Japan | 385/46 |
| 4273222 | 9/1991 | Japan . | |
| 4240830 | 8/1992 | Japan . | |
| 55322 | 1/1993 | Japan . | |

Primary Examiner—John D. Lee
Assistant Examiner—Phan T. Heartney
Attorney, Agent, or Firm—Sughrue, Mion, Zinn, Macpeak & Seas

[57] ABSTRACT

An active optical coupler for use in an optical data link communication system includes a multi channel coupler having a plurality of input channel fibers for receiving an original optical signal, an optical branch separating the original optical signal into a predetermined number of separated optical signals, and a plurality of output channel fibers for distributing the separated optical signals. An amplification circuit is connected to one of the output channel fibers which distributes the separated optical signal having a lowest power for amplifying this separated optical signal to produce an amplified optical signal. This amplified optical signal is supplied to any other of the input channels other than that which the original optical signal is input to and then distributed to the output channels again.

9 Claims, 10 Drawing Sheets

ACTIVE OPTICAL COUPLER FOR OPTICAL DATA LINK COMMUNICATION SYSTEM

BACKGROUND OF THE INVENTION

1. Field of the Invention

The present invention relates to an active optical coupler for use in an optical fiber data link system and a method for amplifying an optical signal.

2. Description of the Prior Art

FIG. 13 shows an example of a conventional optical star coupler SC applied to an optical fiber data link system having four optical terminals Ta, Tb, Tc, and Td. The optical terminal Ta is provided with a receiving port RXa for receiving an optical signal and a transmitting port TXa for transmitting the optical signal. Other terminals Tb, Tc, and Td are also provided with receiving ports RXb, RXc, and RXd and transmitting ports RTb, RTc, and RTd, respectively. When the terminal Ta transmitted an optical signal PS from the transmitting port TXa toward the star coupler SC, the optical signal PS is distributed into four optical signals PSa, PSb, PSc, and PSd which will be further transmitted therefrom and received by the receiving port RXa, RXb, RXc, and RXd, respectively. Thus, the distributed optical signal PSa which is distributed from the original signal PS returns to the terminal Ta which transmitted the original signal PS.

In FIG. 14, an example of the conventional star coupler SC employed in the optical fiber data link system of FIG. 13 is shown. The star coupler SC includes a mixing rod M having first and second end portions Ma and Mb, a first bundle having "l" number of optical plastic fibers FI which is optically connected with the first end portion Ma, and a second bundle having "m" number of optical plastic fibers FO which is optically connected with the second end portion Mb. When the optical signal PS representing an information is supplied to any of the optical plastic fibers, for example FIl, the original optical signal PS is distributed to "m" number of optical fibers FO1 to FOm through which distributed signals PS1 to PSm are output, respectively. In this case, the first and second bundles of optical fibers FI and FO function as an input channel and an output channel, respectively.

However, since the optical plastic fiber bundles FI and FO and the mixing rod M have different coefficients of expansion, they expand or shrink at a different thermal expansion rate when the ambient temperature changes, resulting in a big change of the optical characteristics of the star coupler SC. Furthermore, since the mixing rod M is optically connected with the optical plastic bundles FI and FO at the end portions Ma and Mb without any physical connection, the loss of optical signal power at such connected portion becomes large according to the temperature change. Additionally, the vibration coming from the externals displaces the optical fiber bundles FI and FO with respect to the mixing rod M, causing the complete removal of fiber bundles FI and FO therefrom. When the terminals Ta, Tb, Tc, and Td are placed at a widespread area, the optical fiber data link system requires additional optical signal amplifiers on such a long distant optical transmission line therebetween.

In FIG. 15, an example of a conventional active optical coupler proposed in consideration of the above described problems is shown. In this example, the conventional active coupler Ac is used in a 4×4 channel communication system which has four input channels and four output channels. The active coupler Ac includes a first photoelectric converter PI having four electric transducers PIa, PIb, PIc, and PId corresponding to input channels, a second photoelectric converter PO having four electric transducers POa, POb, POc, and POd and amplifier AM connected between the first and second photoelectric conversion means PI and PO.

When the optical signal PS coming from the terminal Ta is input to the photoelectric transducer PIa, the optical signal PS is converted into an electric signal ES by the photoelectric transducer PIa and is transmitted to the amplifier AM. The amplifier AM amplifies the electric signal ES and produces an amplified electric signal ES' which will be supplied to the second photoelectric converter PO. By each of photoelectric transducers POa, POb, POc, and POd, the electric signal ES' is converted into optical signals PS'. Thus, the optical signal with a weak power is amplified and distributed to the terminals Ta, Tb, Tc, and Td through the photoelectric transducers POa, POb, POc, and POd, respectively.

However, the active coupler Ac requires "n" number of the photoelectric transducers, causing the increase of cost. It is to be noted that "n" is total number of input channels and output channels of the optical fiber data link system. When the amplifier AM is disabled by such a case that the electric power supply to the amplifier AM is interrupted or the amplifier AM is out of order, the communication, in the optical fiber data link system is also disabled, thereby lowering the system reliability.

SUMMARY OF THE INVENTION

The object of the present invention is therefore to provide an imaging device which solves these problems.

The present invention has been developed with a view to substantially solving the above described disadvantages and has for its essential object to provide improved an active optical coupler for use in an optical data link communication system comprising a multi channel coupler means having a plurality of input channels for receiving an original signal, a separation means for separating said original signal to a predetermined number of separated signals, and a plurality of output channels for distributing said separated signals; and an amplification means for amplifying one of said separated signals to produce an amplified signal and supplying said amplified signal to one of said input channels.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

Figure 1:
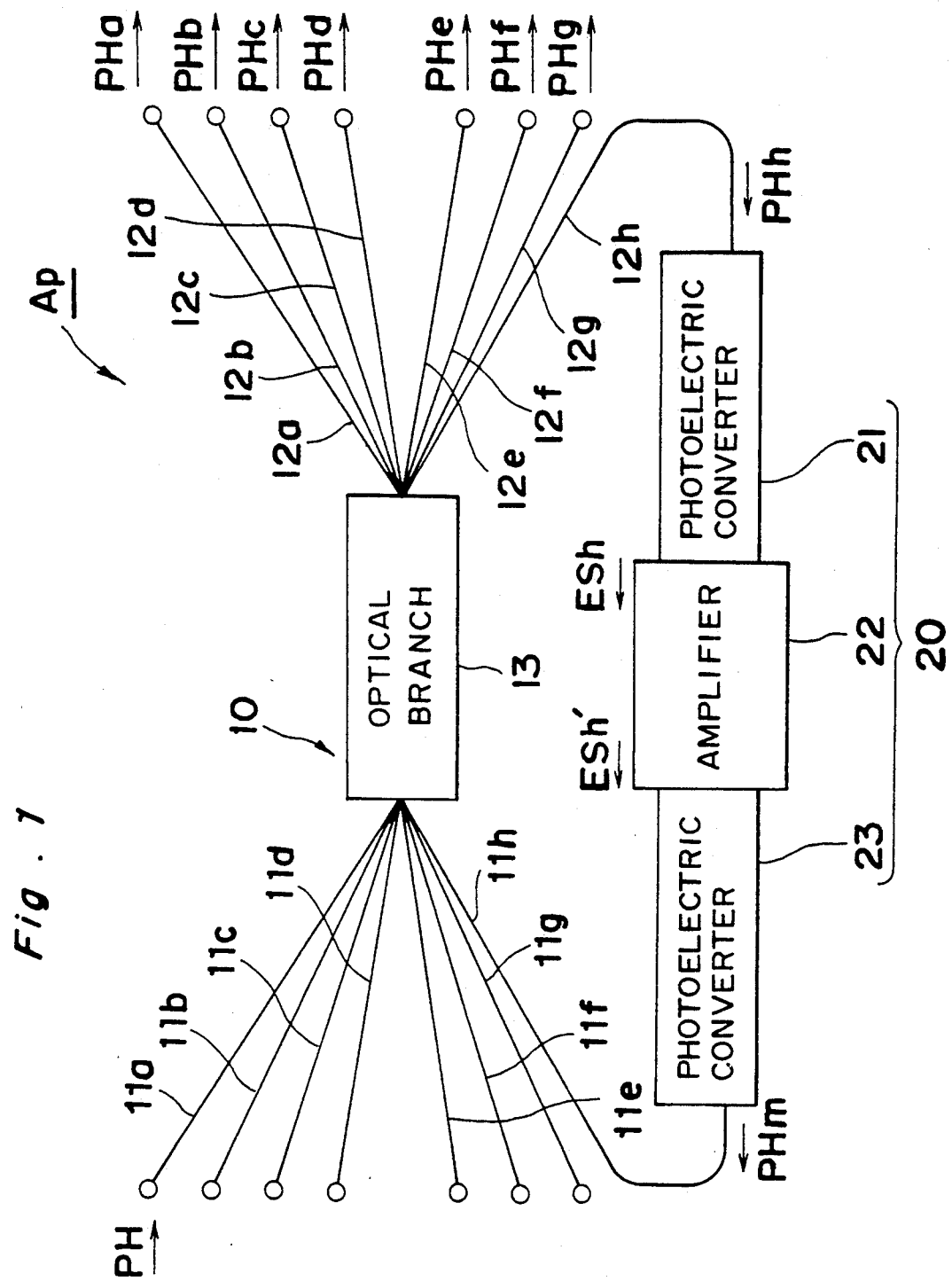
FIG. 1 is a block diagram of an active optical coupler according to an embodiment of the present invention.

Referring to FIG. 1, an active optical coupler according to the present invention is shown. The active optical coupler Ap comprises a $2^3 \times 2^3$ multi channel star coupler 10 having $2^n$ input channels and $2^n$ output channels for an optical signal and an optical signal amplification unit 20. It is to be noted that "n" is an integer and 3 is employed in this embodiment. The multi channel star coupler 10 has eight ($2^n$) input optical plastic fibers 11a, 11b, 11c, 11d, 11e, 11f, 11g, and 11h for functioning as input channels and eight output optical plastic fibers 12a, 12b, 12c, 12d, 12e, 12f, 12g, and 12h for functioning as output channels, and an optical branch 13 provided therebetween.

The active optical coupler 10 further comprises an optical signal amplification unit 20 having a first photoelectric converter 21, a second photoelectric converter 23, and an amplifier 22 connected between the converters 21 and 23. The first and second photoelectric converters 21 and 22 are connected with any of output and input optical fibers 12a to 12h (12h in this embodiment) and 11a to 11h (11h in this embodiment), respectively.

In this active optical coupler 10, an optical signal PH is input into any of input optical plastic fibers 11a to 11g other than the fiber 11h which is connected to the second photoelectric converter 23 and is distributed to output optical plastic fibers 12a to 12h to produce distributed signals PHa, PHb, PHc, PHd, PHe, PHf, PHg, and PHh, respectively. The distributed optical signal PHh is input to the first photoelectric converter 21 and is converted to an electric signal ESh representing the distributed optical signal PHh. The amplifier 22 amplifies the electric signal ESh and produced an amplified electric signal ESh'. The second photoelectric converter 23 converts the amplified electric signal ESh' to an optical signal PHm which is substantially the same as the original photo signal PH, but has a greater power than that of the distributed signal PHh. The optical signal PHm is further input into the input optical fiber 11h, resulting in a positive feed back of the optical signal.

Referring to FIGS. 2, 3, 4, 5, 6, and 7, the steps for making the star coupler 10 according to the present invention is described.

Figure 2:
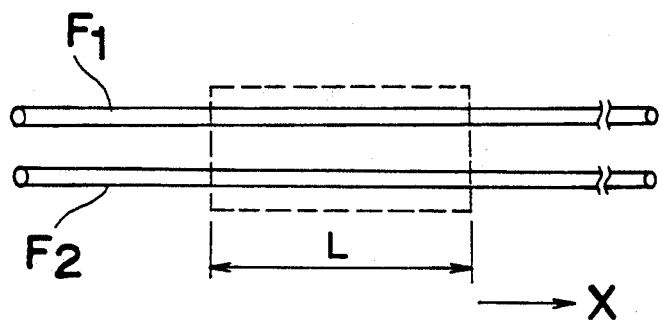
FIGS. 2 to 7 are illustrations of assistance in explaining the manufacturing steps of a multi channel star coupler used in the active optical coupler shown in FIG. 1.

As shown in FIG. 2, fist and second optical plastic fibers F1 and F2 are arranged parallel to each other at the first stage. The first and second optical plastic fibers F1 and F2 are fusion bonded by ultrasonic bonding the middle portions thereof, extending a predetermined length L along with a direction X, as shown by a dotted line. Thus, a first multi-channel coupler unit 30A is produced by two optical plastic fibers F1 and F2. An ultrasonic bonding operation of the optical plastic fibers is disclosed in U.S. patent application Ser. No. 07/642,266 filed Jan. 16, 1991, and now U.S. Pat. No. 5,146,520 assigned to the same assignee as the present application.

Figure 3:
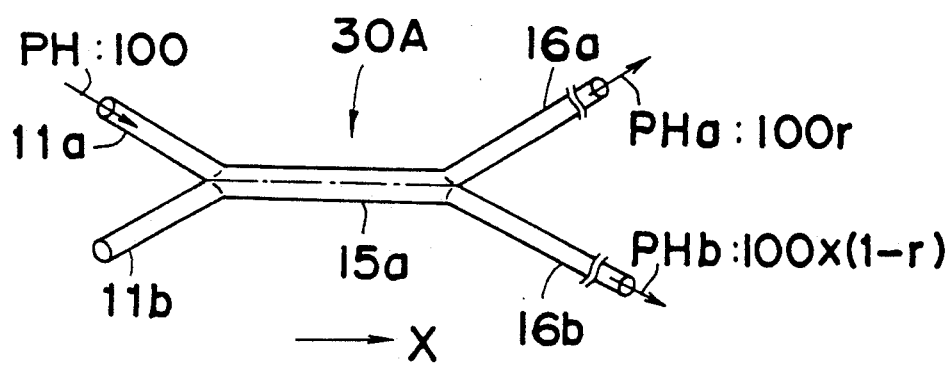

In FIG. 3, the first multi-coupler unit 30A is shown. The multi-channel coupler unit 30A has two ($2^1$) optical plastic fibers 11a and 11b, two ($2^1$) output optical plastic fibers 16a and 16b, and an optical joint portion 15a extending in the direction X between a pair of input fibers 11a and 11b and a pair of output fibers 16a and 16b.

In this multi-channel coupler unit 30A, the optical signal PH input to, e.g., the input optical fiber 11a is separated to two signals PHa and PHb during transmitting through the optical joint portion 15 at a distribution rate of r:1−r (r≧0.5). These two signals PHa and PHB are distributed by the output optical fibers 16a and 16b, respectively. When the optical signal PH has an optical power of "100", the optical power of distributed signals PHa and PHb are calculated by the following equations.

Optical power of $PHa = 100 \times r/\{r + (1 - r)\} = 100r$ (1)

Optical power of $PHb =$ (2)
$$100 \times (1 - r)/\{r + (1 - r)\} = 100 \times (1 - r)$$

Figure 4:
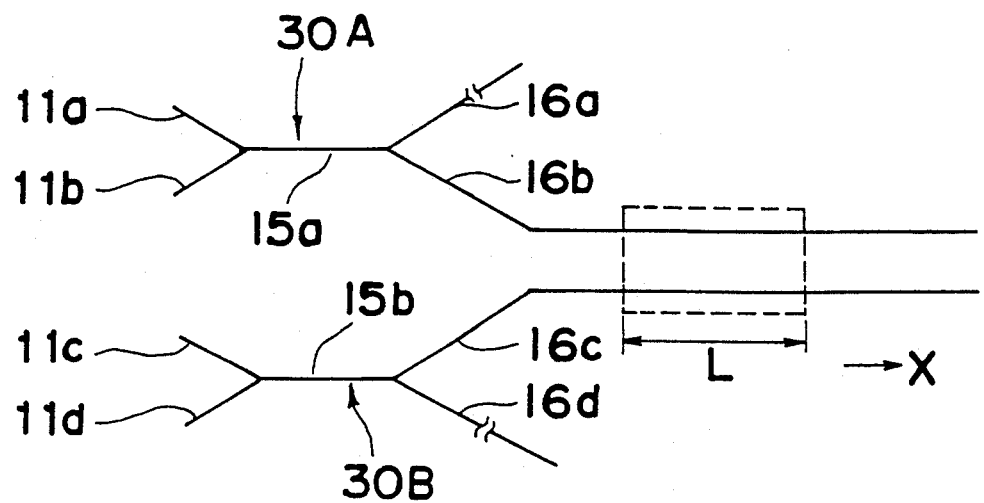
Figure 5:
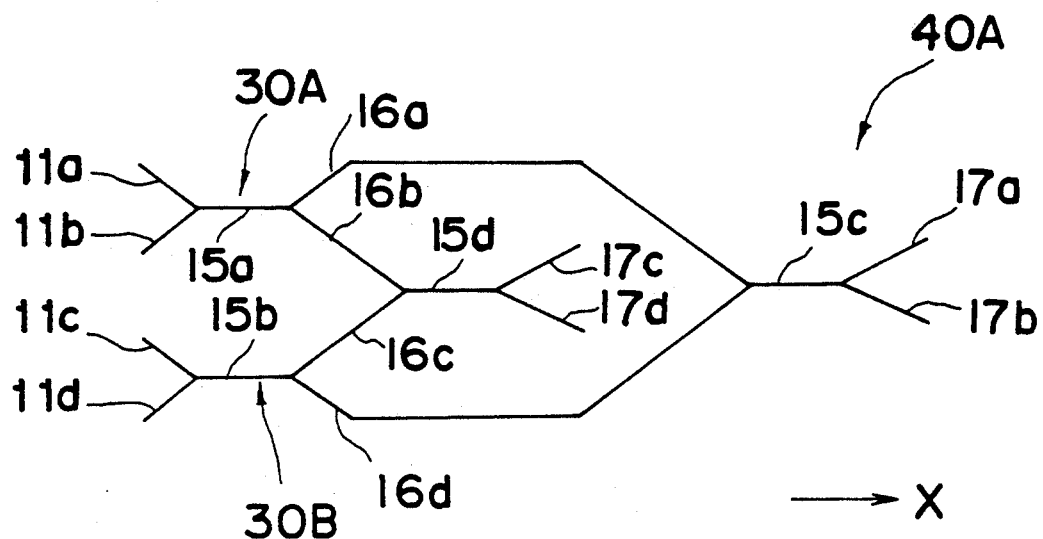

In FIG. 4, two sets 30A and 30B of a $2^1 \times 2^1$ multi channel star coupler units are shown. The second multi-coupler unit 30B has two ($2^1$) input channel fibers 11c and 11d, two ($2^1$) output channel fibers 16c and 16d, and an optical joint portion 15b therebetween is shown. The second $2^1 \times 2^1$ multi-coupler unit 30B is placed in parallel to the first $2^1 \times 2^1$ multi-coupler unit 30A along with the direction X. The output channel fiber 16c and 16d are fusion bonded at a portion enclosed by a dotted line to form a third optical joint portion 15c and a third pair of output channel fibers 17a and 17b extending therefrom, as shown in FIG. 5. Similarly, the output channel fibers 16b and 16d are fusion bonded at the middle portion thereof to form a fourth optical joint portion 15d and a fourth pair of output channel fibers 17c and 17d extending therefrom. Thus, a first $2^2 \times 2^2$ multi channel star coupler 40A having eight ($2^2$) input channel fibers 11a to 11d, eight ($2^2$) output channel fibers 17a to 17b, and four ($2^2$) optical joint portions 15a to 15c is obtained as shown in FIG. 5.

Figure 6:
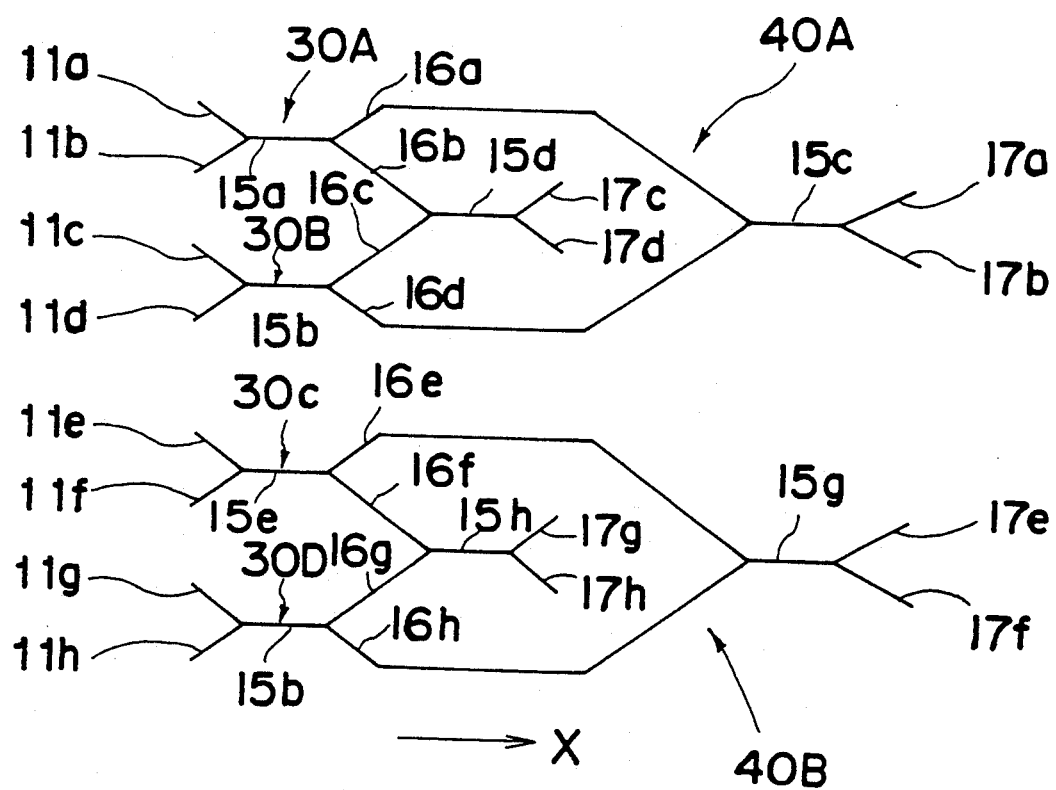
Figure 7:
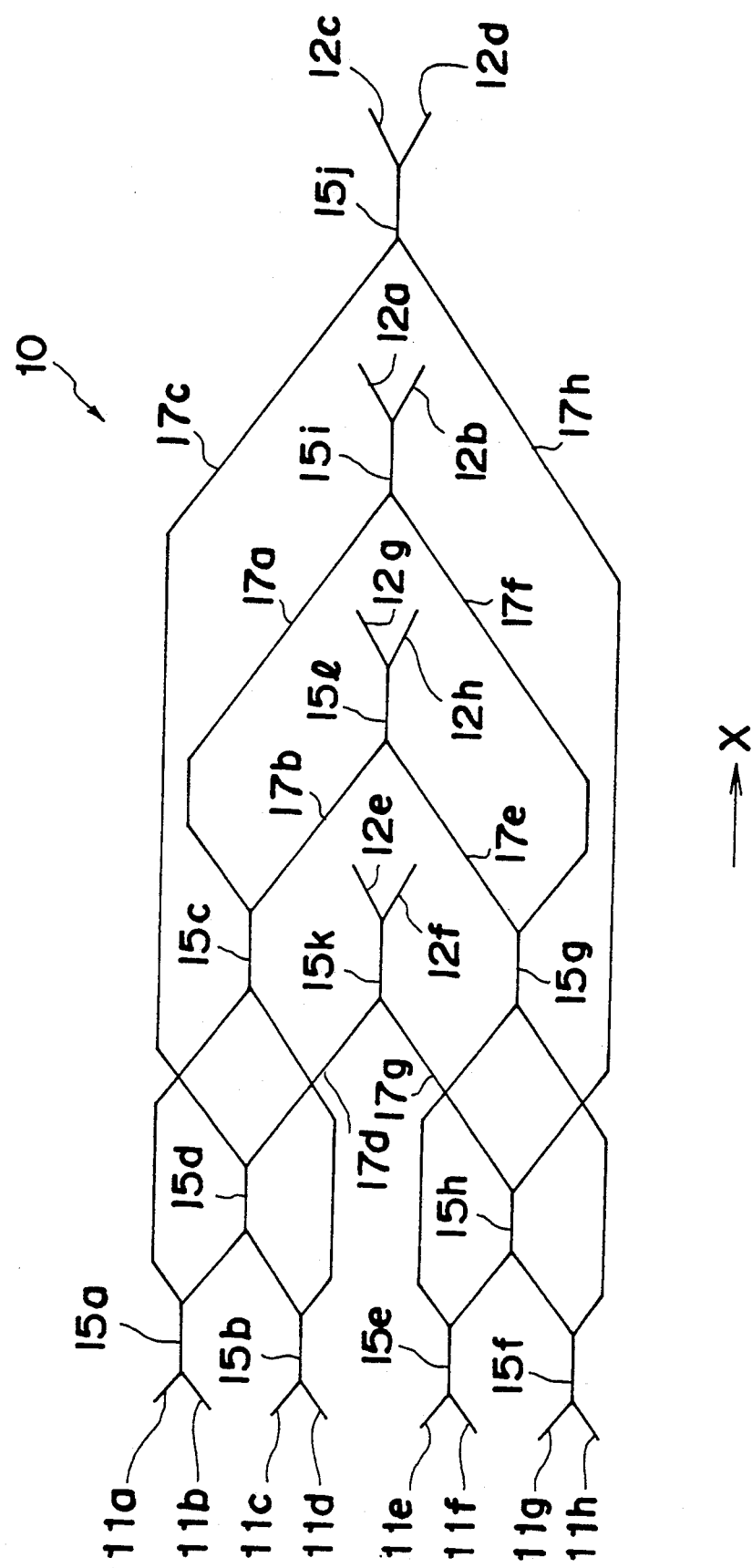

In FIG. 6, two sets 40A and 40B of $2^2 \times 2^2$ multi channel star coupler units are shown. The second multi channel star coupler 40B has four ($2^2$) input channel fibers 11e to 11h, four ($2^2$) output channel fibers 17e to 17h, and two optical joint portions 15g and 15h. The output channel fibers 17a and 17f are fusion bonded to form a fifth optical joint portion 15i and a fifth pair of output channel fibers 12a and 12b. Similarly, the output channel fibers 17c and 17h, 17b and 17e, and 17d and 17g are fusion bonded so as to form a sixth, a seventh and an eighth optical joints 15j, 15k, 15l and a sixth, a seventh and an eighth pairs of output channel fibers 12c and 12d, 12e and 12f, and 12g and 12h, respectively, as shown in FIG. 7. Thus, the $2^3 \times 2^3$ multi channel star coupler 10 having eight ($2^3$) input channel fibers, eight ($2^3$) output channel fibers, and eight ($2^3$) optical joint portions shown in FIG. 1 is produced. Eight optical joint portions 15a to 15b constitute the optical branch 13 shown in FIG. 1.

Referring back to FIG. 1, the operation of active coupler Ap is described herebelow. When the active coupler Ap is at a passive state which means that the optical signal amplification unit 20 is disabled, the original optical signal PH input into the input channel fiber 11a is distributed by the optical branch 13 at a predetermined distribution rate into eight output channel fibers 12a to 12h and the distributed signals PHa to PHh are produced therefrom, respectively.

However, when the active coupler Ap is at active state which means that the optical signal amplification unit 20 is enabled, the distributed signals PHa to PHg are amplified and amplified distributed signals are produced from the output channel fibers 12a to 12g in the following manner.

The signal PHh distributed from the original signal PH at the predetermined distribution ratio is input to the first photoelectric converter 21 through the output channel fiber 12h. It is to be noted that the output channel fiber (12h in this embodiment) which leads to the optical signal amplification unit 20 is referred to as "a signal take-out fiber" hereafter. The first photoelectric converter 21 converts the distributed optical signal PHh to the electric signal ESh.

The amplifier 22 amplifies the electric signal ESh and produces the amplified electric signal ESh'. The second photoelectric converter 23 converts the amplified electric signal ESh' to the optical signal PHm. Thus, the amplified optical signal PHm synchronizing with the distributed optical signal PHh is obtained.

The amplified optical signal PHm is fed back to the input channel fiber 11h. It is to be noted that the input channel fiber (11h in this embodiment) which leads to the star coupler 10 is referred to as "an amplified signal feed-back fiber" hereafter. The amplified optical signal PHm is distributed to each of output channel fibers 12a to 12h at the predetermined distribution ratio by the optical branch 13 again. Therefore, the distributed optical signals PHa to PHg produced from the output channel fibers 12a to 12h becomes a sum of the distributed signals based on the original optical signal PH and the distributed signals based on the amplified optical signal PHm, resulting in increase of the power level of the output signals.

Next, the active coupler having optical plastic fibers made of non-crosslinked polymethyl methacrylate according to the present invention, were tested so as to evaluate the performance at a passive state and an active state.

The optical joint portions 15a to 15h are manufactured by the ultrasonic fusion bonding method (U.S. patent application Ser. No. 07/642,266 filed on Jan. 16, 1991 now U.S. Pat. No. 5,146,520) under the following conditions.

Clamping pressure=10 Kgf
Vibrational frequency=15 kHz
Vibrational amplitude=40 μm
Vibration applying time=0.5 second
Length of the optical joints in the longitudinal direction (L)=20 mm The red light having an wave length of 660 nm (Optical strength PI=15.4 μW) emitted by an optical power source is input to the input channel optical fiber 11a. At the same time, each light transmitted from the output channel optical fibers 12a to 12g is directly received and measured by the optical power measuring system to obtain power levels Pa to Pg thereof, respectively, by the optical power measuring system.

The results of the measurement are as follows. At the passive state, the power level Pa to Pg are 1.32 μW, 1.33 μW, 1.28 μW, 1.30 μW, 1.20 μW, 1.35 μW, and 1.50 μW, respectively. The excess loss LS is calculated by the following equation of $$LS = -10 \times \log((1.32 + 1.33 + 1.28 + 1.30 + 1.20 + 1.35 + 1.50)/15.4)$$
$$= 2.19 \text{ (dB)}.$$

And the mean value of the insertion loss is 10.73 (dB).

At the active state, the power level Pa to Pg are 2.51 μW, 2.55 μW, 2.54 μW, 2.47 μW, 2.34 μW, 2.55 μW, and 2.97 μW, respectively. The excess loss LS is 7.82 (dB) and power consumption at the amplifier 22 is approximately 35 mA.

Since the active optical coupler Ap returns the amplified optical signal PHm produced by amplifying the distributed optical signal PHn which is a portion of the original optical signal PH so as to synchronized therewith, signal PH, the active coupler Ap can transmit optical signals having greater power and can be applied to the long distance optical communication. In addition to this, the active optical coupler Ap can continue the optical communication at the passive state even when the amplifying unit 20 is disable due to such a cause that the power supply to the unit 20 is interrupted.

As apparent from the above description, the active optical coupler Ap according to the present invention requires one pair of photoelectric converters regardless of the number of input-and-output channels, resulting in reduction of manufacturing cost and power consumption.

Furthermore, since the star coupler 13 is made by only plastic fibers having the same coefficients of expansion, all parts of the star coupler 13 expand or shrink at the same expansion rate according to the variation of the ambient temperature, causing the active coupler Ap to change its characteristics less. In addition to this, since the optical joint portions 15a to 15h are firmly formed by the technique of fusion bonding, the optical branch 13 as an assembly of the optical joint portions 15a to 15h is strong enough to withstand against the stress ordinarily applied thereto.

In the active optical coupler Ap according to the preferred embodiment described above, any of input channel fibers 11a to 11h, for example 11h, can be employed as the amplified signal feed-back fiber, and any of output channel fibers 12a to 12h, for example 12h, can be employed as the signal take-out fiber, respectively. However, in consideration of the energy efficiency between input and output signals, it is preferable to arrange such that substantially all portions of the optical signal (PHm) returned to the amplified signal feed-back fiber (11h) are distributed to transmit from the other output channels fibers (12a to 12g) other than the signal take-out fiber (12h). This can be realized by selecting one output channel fiber at which the power level of optical signal transmitted therefrom is the lowest among other output channel fibers as the signal take-out fiber.

Figure 8:
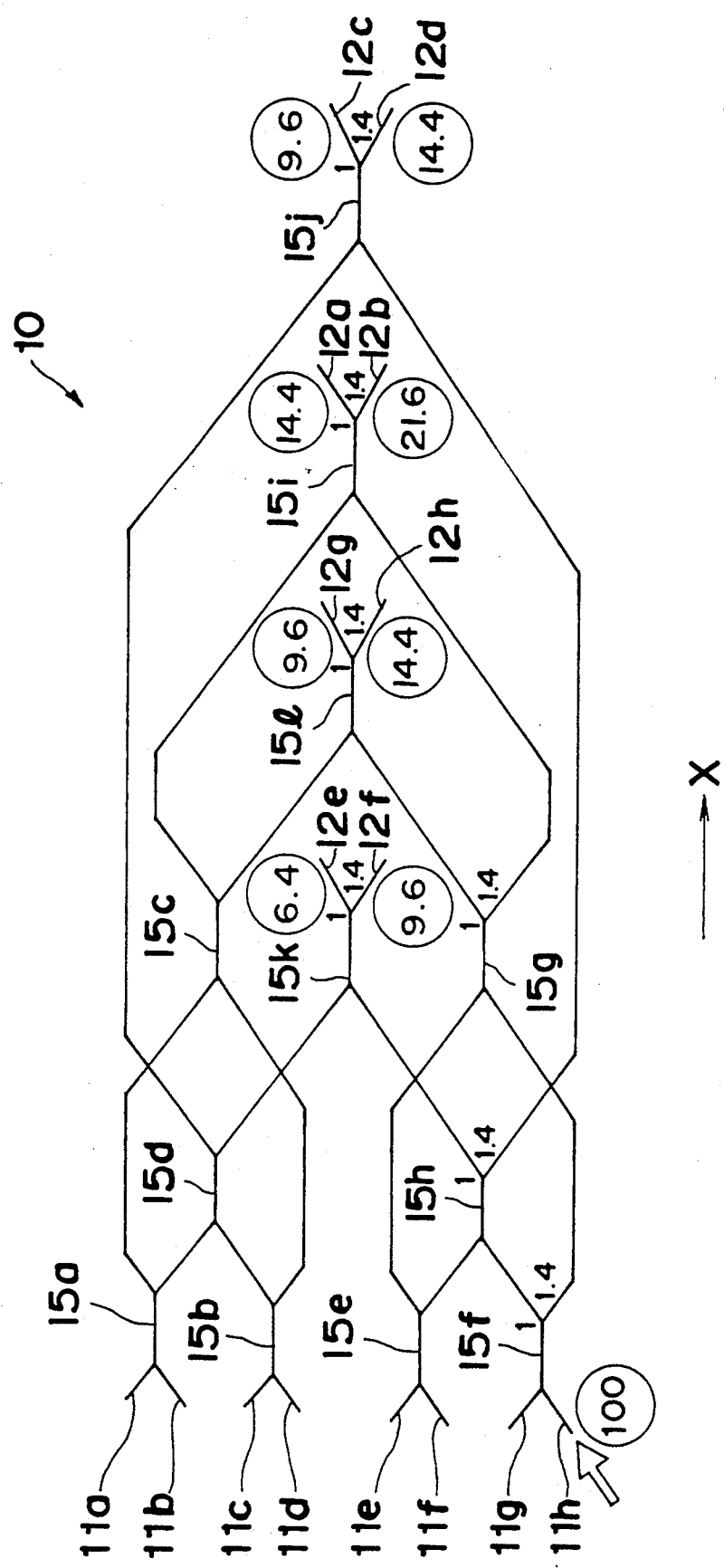
FIG. 8 is an illustration showing the power level of the distributed optical signals transmitted from the output channel fibers.

Referring to FIG. 8, the input power level at the amplified signal feed-back fiber and the output power level at each of output channel fibers 12a to 12h of the star coupler 10 according to the present invention are shown. When the distribution ratio at bifurcated outputs of each of optical joint portions 15a to 15h is 1:1.4, the optical signal having a "100" power level input into the fiber 11h is distributed by the optical joint portions 15a to 15h and transmitted from the output channel fibers 12a to 12h (as distributed optical signals having power levels of 14.4 (at 12a), 21.6 (at 12b), 9.6 (at 12c), 14.4 (at 12d), 6.4 (at 12e), 9.6 (at 12f), 9.6 (at 12g), and 14.4 (at 12h). From this, it is apparent that the output channel fiber 12e at which the output signal level is minimal is most preferable as the amplified signal feedback fiber. The relationship between the distribution ratio and the strength of the optical signal transmitted from the output channel fibers is described later.

The active coupler Ap prepared in the above mentioned manner such that the input channel fiber 11h and the output channel fiber 12e are connected with the second photoelectric converter 23 as the amplified signal feed-back fiber and the first photoelectric converter 21 as the signal take-out fiber, respectively, is tested so as to evaluate the performance at passive and active and states.

The red light having an wave width of 660 nm (Optical strength PI=26.4 μW) emitted by the optical power measuring system is input into the input channel optical fiber 11a. At the same time, each light transmitted from the output channel optical fibers 12a to 12h except 12e is directly received and measured the power level Pa to Ph except Pe thereof, respectively, by the optical power measuring system.

The results of the measurement are as follows. At the passive state, the power level Pa to Ph except Pe are 2.49 μW 3.42 μW, 2.16 μW, 2.61 μW, 1.90 μW, 1.69 μW, and 2.36 μW, respectively. The excess loss LS is calculated by the following equation of $$LS = -10 \times \log((2.49 + 3.42 + 2.16 + 2.61 + 1.90 + 1.69 + 2.36)/26.4)$$
$$= 2.01 \text{ (dB)}.$$

And the mean value of insertion loss is 10.46 (dB).

At the active state, the power level Pa to Pg except Pe are 4.05 μW, 5.20 μW, 5.03 μW, 5.59 μW, 3.45 μW, 3.86 μW, and 4.45 μW, respectively. The excess loss LS is 7.67 (dB) and power consumption at the amplifier 22 is approximately 35 mA.

Furthermore, another active coupler Ap' (not shown) manufacture in the same construction is tested so as to evaluate the performance at passive and active states, respectively, under the same conditions.

The results of the measurement are as follows. When the red light having a wave length of 660 nm (PI=26.4 μW) is input to the output channel fiber 11a, the power level Pa to Ph except Pe at the passive state are 3.42 μW, 2.49 μW, 1.90 μW, 2.36 μW, 1.69 μW, 2.16 μW, and 2.61, respectively. The excess loss LS is calculated by the following equation of $$LS = -10 \times \log((3.42 + 2.49 + 1.90 + 2.36 + 1.69 + 2.16 + 2.61)/26.4)$$
$$= 2.01 \text{ (dB)}.$$

And the mean value of insertion loss is 10.46 (dB).

At the active state, the power level Pa to Pg except Pe are 5.20 μW, 4.05 μW, 3.45 μW, 4.45 μW, 3.86 μW, 5.59 μW, and 5.03 μW, respectively. The excess loss LS is 7.67 (dB) and power consumption at the amplifier 22 is approximately 35 mA.

Figure 9:
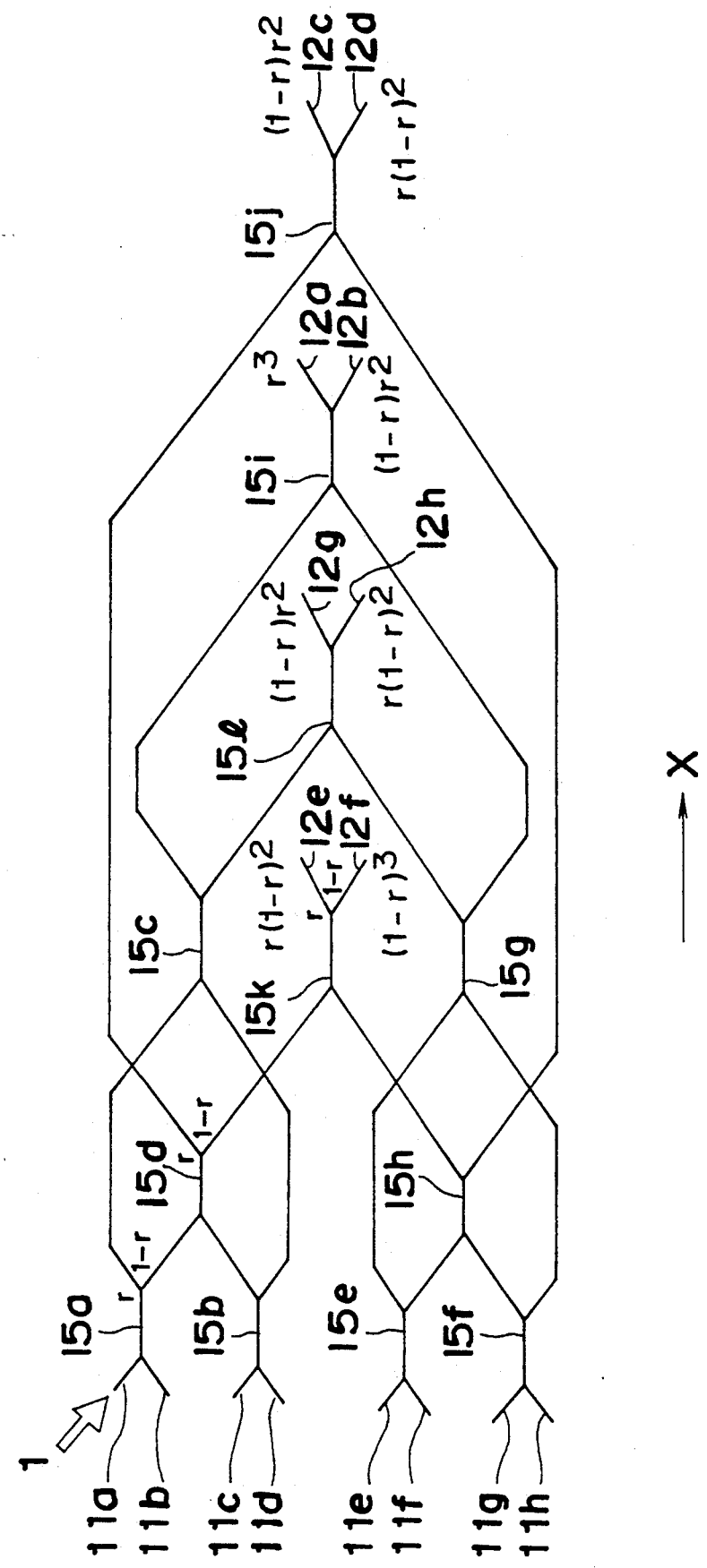
FIG. 9 is an illustration showing the optical strength of the distributed optical signals transmitted from the output channel fibers.

Referring to FIG. 9, the relationship between the light strength at each of output channel fibers and the distribution ratio is described herebelow. The input optical signal is separated at bifurcated outputs of each of optical branch portions 15a to 15h at r:1−r, as described in the foregoing description with reference to FIG. 3. For the sake of clarity, now it is assumed that the light having an optical strength of "1" is input into the input channel fiber 11a and no excess loss is present in the star coupler 10. The optical strength of lights transmitted from the output channel optical fibers 12a to 12h are $r^3$, $(1-r)r^2$, $(1-r)r^2$, $r(1-r)^2$, $r(1-r)^2$, $(1-r)^3$, $(1-r)r^2$, and $r(1-r)^2$, respectively. From this, the output channel fiber 12f at which the output signal level is minimal is most preferable as the signal take-out fiber.

As is apparent from the above description, when the optical signal PHf transmitted from this signal take-out fiber 12f is amplified to have a power level of "1" and returned into the input channel optical 11a, the active optical coupler Ap can additionally output amplified optical signals having optical strength of $r^3$, $(1-r)r^2$, $(1-r)r^2$, $r(1-r)^2$, $r(1-r)^2$, $(1-r)^3$, $(1-r)r^2$, and $r(1-r)$, from the output channel fibers 12a to 12e, 12g, and 12h.

Referring to Table 1, the optical strength of signals transmitted from the output channel fibers 12a to 12e, 12g, and 12h at the passive and active states are shown.

TABLE 1

|  | PORT 12a | PORT 12b | PORT 12c | PORT 12d | PORT 12e | PORT 12g | PORT 12h |
| --- | --- | --- | --- | --- | --- | --- | --- |
| PORT 11b | A<br>A+B | C<br>C+C | C<br>C+B | B<br>B+C | B<br>B+B | D<br>D+C | B<br>B+A |
| PORT 11c | C<br>C+B | C<br>C+C | A<br>A+B | B<br>B+C | B<br>B+B | B<br>B+C | D<br>D+A |
| PORT 11d | D<br>D+B | B<br>B+C | B<br>B+B | A<br>A+C | C<br>C+B | B<br>B+C | C<br>C+A |
| PORT 11e | C<br>C+B | D<br>D+C | B<br>B+B | C<br>C+C | C<br>C+B | B<br>B+C | A<br>A+A |
| PORT 11f | C<br>C+B | C<br>C+C | D<br>D+B | C<br>C+C | A<br>A+B | B<br>B+C | B<br>B+A |
| PORT 11g | C<br>C+B | B<br>B+C | B<br>B+B | D<br>D+C | C<br>C+B | B<br>B+C | C<br>C+A |
| PORT 11h | B<br>B+B | C<br>C+C | B<br>B+B | B<br>B+C | D<br>D+B | C<br>C+C | C<br>C+A |

In the table 1, "PORT" means the optical fibers and upper and lower figures in each cell means the optical strength of signals at passive and active states, respectively. When an optical signal is input into the input channel optical fiber 11b, for example, the optical strength of the signals transmitted from the output channel fiber 12a to 12e, 12g, and 12h are "A", "C", "C", "B", "B", "D", and "B" at the passive state, and "A+B", "C+C", "C+B", "B+C", "B+B", "D+C", and "B+A" at the active state, respectively. "A", "B", "C", and "D" in cells mean $r^3$, $(1-r)r^2$, $r(1-r)^2$, and $(1-r)^3$, respectively. Since "r" is equal to or greater than 0.5 as described above, a relationship such as $r^3 > (1-r)r^2 > r(1-r)^2 > (1-r)^3$ is present.

As understood from Table 1, when the optical active coupler Ap according to the present invention works at the active state, the optical strength shows the greatest value with the combination of A and A, as expressed by the equation of $$A+A = r^3 + r^3 \tag{3}$$

And, the optical strength shows the lowest value with the combination of C and D (D and C), as expressed by the equation of $$C+D = r(1-r)^2 + (1-r) \tag{4}$$

Resulting from this, the optical strength ratio f(r) has the maximum value as expressed by the equation of $$f(r) = (r^3 + r^3)/\{r(1-r)^2 + (1-r)^3\} \tag{5}$$

Figure 10:
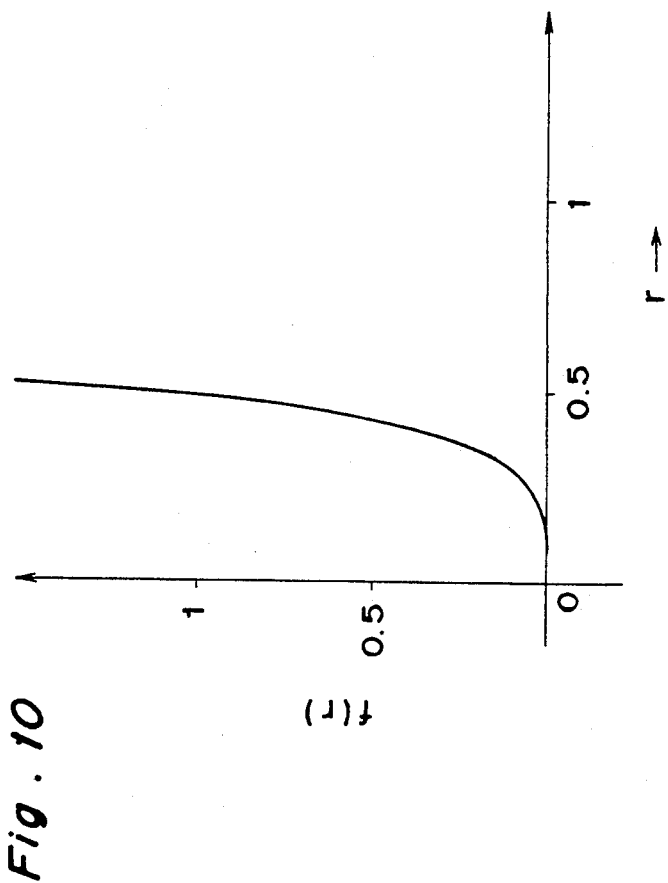
FIG. 10 is a graph showing the relationship between the distribution ratio and the optical strength ratio.

The optica strength ratio f(r) is a function of "r" and is shown in a graphic form in FIG. 10.

In the technical field of the present invention, it is regarded that the active optical coupler distributes the optical signal evenly when the difference between the input and out signals is within 1 dB. To suppress this input-and-output difference within 1 dB, the active optical coupler shall be prepared such that the optical strength ratio f(r) thereof will be between 1 and 1.2, as expressed by the equation of $$1 \leq f(r) \leq 1.2 \tag{6}$$

To satisfy this equation (5), "r" shall be between 0.5 and 0.518, as expressed the equation of $$0.5 \leq r \leq 0.518 \tag{7}$$

Resulting from this, it is required that the distribution rate at optical joint portions 15a to 15h is selected from the range of 1:1 to 0.7:1.

However, if the optical path from the signal take-out fiber (12h) to the signal feed-back fiber (11h) is long, it takes a longer time for converting the optical signal (PHn) into the amplified optical signal (PHm) and inputting the converted signal (PHm) into the star coupler 10, resulting in lagging of the converted signal (PHm) with respect to the optical signal (PHn) taken. Since this lagged signal (PHm) is further distributed by the optical joint portions 15a to 15h and is transmitted from the output channel fibers 12a to 12h, the original signals and this lagged signal are superimposed such that signals having a different wave form from the original and the lagged signal are transmitted therefrom.

To suppress the production of the superimposed signals, the optical waveguide path of the positive feedback loop comprising the signal take-out fiber (12h), the optical signal amplification unit 20, and the amplified signal feed-back fiber (11h) is preferably prepared in the shortest length.

An optical signal receiving module (not shown) which is connected with the output channel fibers for receiving the optical signals transmitted therefrom has a dynamic range. The dynamic range means the range defined by the two different levels. The first is the minimum power level of the input light the optical sensor provided in the optical signal receiving module can detect. The second is the maximum power level of the input light the optical sensor can detect before being saturated. In the optical data link communication system, the output power level shall be adjusted to be within this dynamic range at the stage of system design or system building. Though the output power level adjustment after system building is seriously required, no conventional optical coupler supplies the means for this purpose. To accomplish this purpose, the present invention supplies the active optical coupler comprising a modified optical signal amplification unit 20' manufactured in the following manner.

Figure 11:
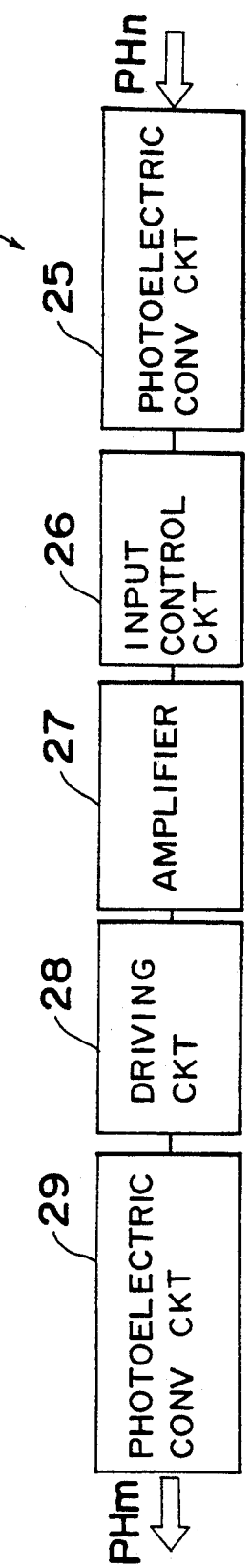
FIG. 11 is a block diagram showing a modification of the amplifying unit in the active optical coupler shown in FIG. 1.
Figure 12:
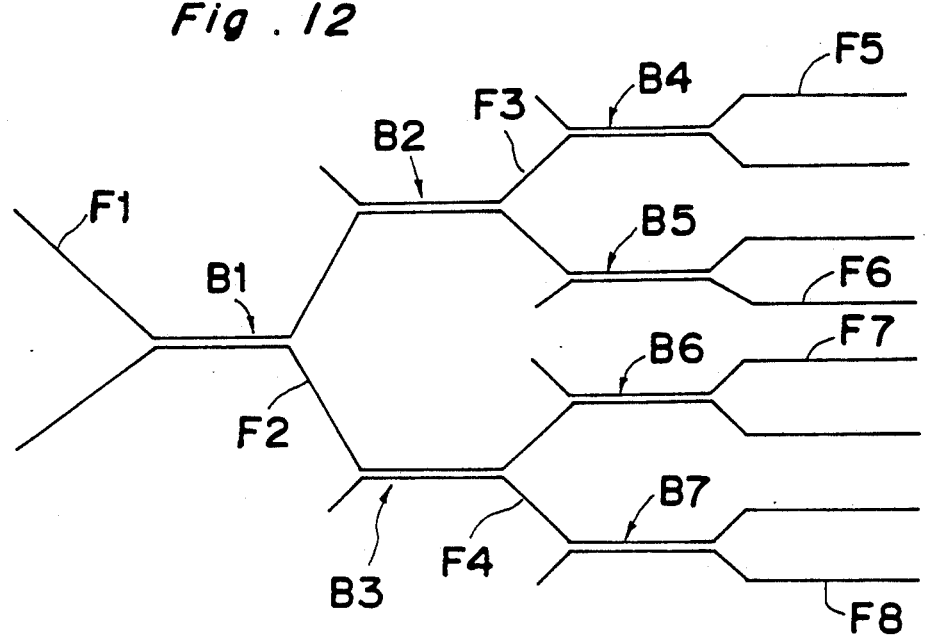
FIG. 12 is an illustration showing a 2×8 multi channel star coupler.
Figure 14:
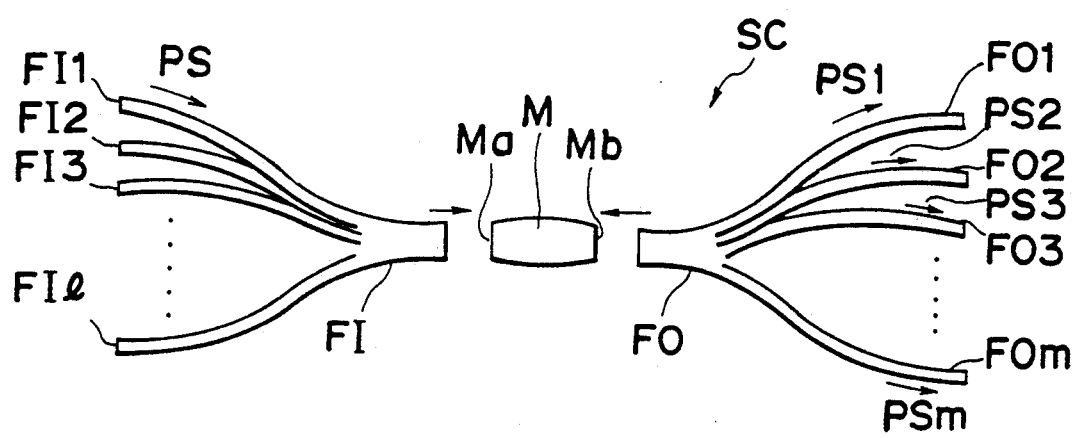
FIG. 14 is an illustration showing a conventional star coupler.
Figure 13:
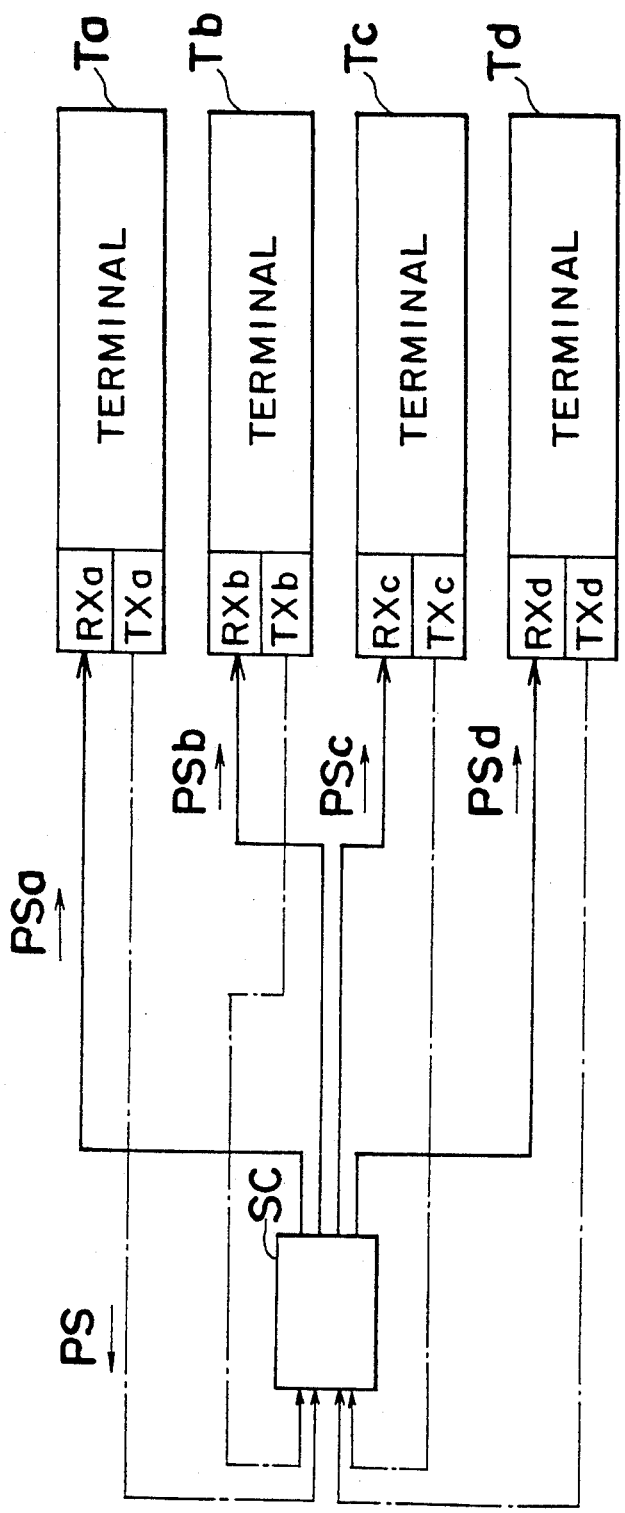
FIG. 13 is a block diagram of a conventional optical fiber data link system.
Figure 15:
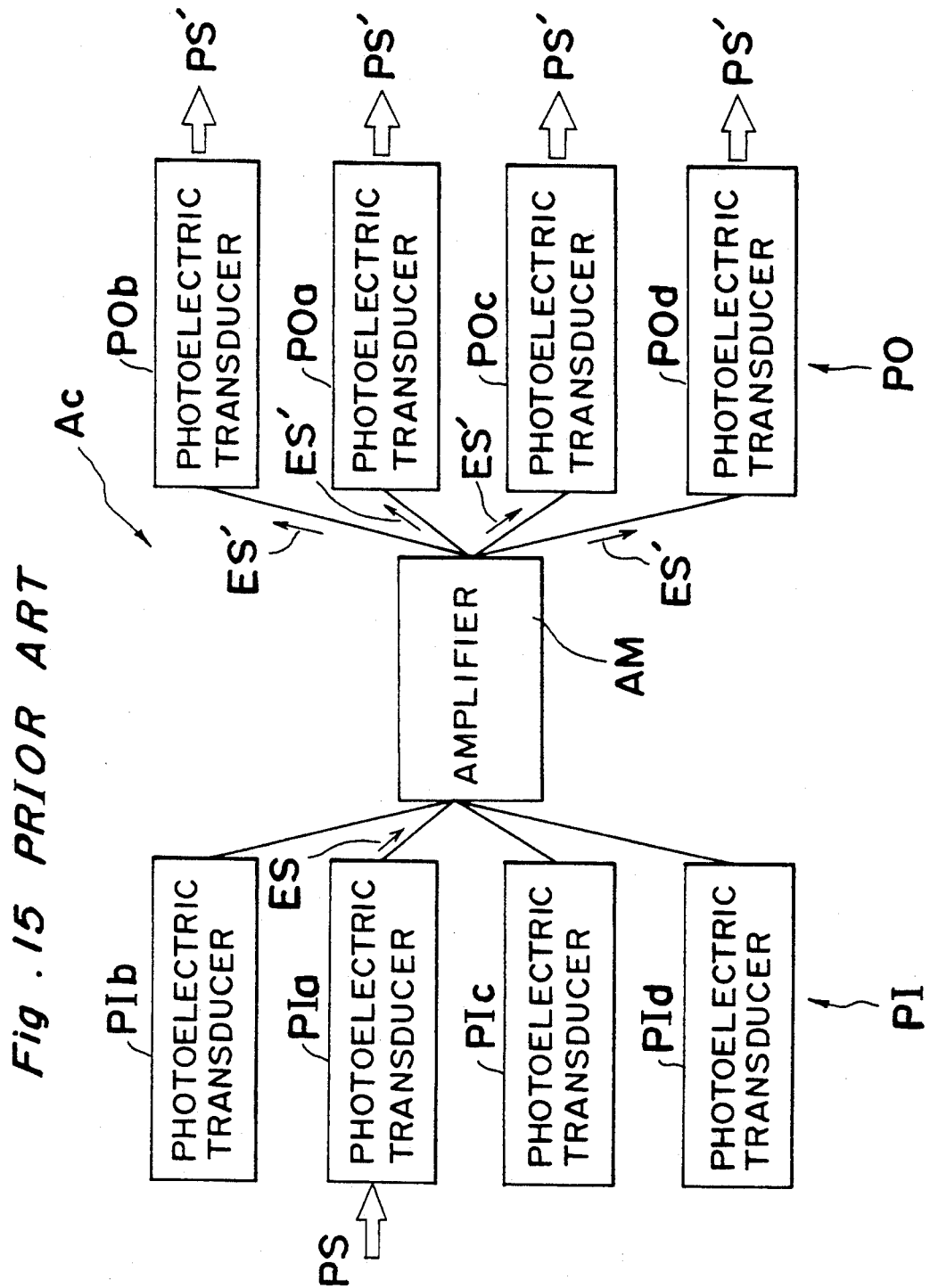
FIG. 15 is a block diagram of a conventional active optical star coupler.

Referring to FIG. 11, the modified optical signal amplification unit 20' which is a modification of the optical signal amplification unit 20 shown in FIG. 1 is shown. Specifically, the amplifier 22 and the first and second photoelectric converter 21 and 23 are replaced by an amplifier 27 and a first and second photoelectric circuits 25 and 29, respectively, and in the modified optical signal amplification unit 20'. An, input control circuit 26 and a driving circuit are additionally provided between the first photoelectric conversion circuit 25 and the amplifier 27 and between the amplifier 27 and the second photoelectric conversion circuit 29, respectively.

The first photoelectric conversion circuit 25 including a photo diode is connected with the signal take-out fiber 12h for receiving and converting the optical signal PHn transmitted therefrom into an electric signal. The input control circuit 26 further converts the converted electric signal so as to stay within a voltage range such that the amplifier 27 linearly operates. After amplification by the amplifier 27, the electric signal is input into the driving circuit 28 which executes the current amplification based on the input electric signal and drives the second photoelectric conversion circuit 29 to convert the electric signal into the optical signal PHm.

As apparent from the above description, the power level of optical signal PHm transmitted from the modified optical signal amplification unit 20' can be adjusted easily by changing the gain of amplifier 27 before or after the modified optical signal amplification unit 20' is installed in the active optical coupler.

Although the preferred embodiment is described with reference to the star coupler 10 having $2^3 \times 2^3$ multi channels, it is needless to say that the present invention can be applied to other multi channel couplers such a $2^2 \times 2^2$ multi channel coupler as shown in FIG. 5. Other multi channel having "s" number of input channels and output channel which is produced by fusion bonding "s" number of optical fibers at the middle portions thereof is also applicable ("s" is an integer greater than 2). Furthermore, another type of multi channel star coupler which comprises eight fibers F1 to F8 to be fusion bonded at the middle portions B1 to B7 is shown in FIG. 8. In other words, any multi channel star coupler which is produced by fusion bonding a plurality of optical fibers so as to have "t" number of input channel fibers and "u" number of output channel fibers is applicable ("t" and "u" are integers greater than one and two, respectively). The multi channel star coupler can be produced to have "u" number of input channel fibers and "t" number of output channel fibers.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An active optical coupler for use in an optical data link communication system, said coupler comprising:
   a multi channel coupler means having a plurality of input channels for receiving an original optical signal, a separation means for separating said original optical signal into a predetermined number of separated optical signals, and a plurality of output channels for distributing said separated optical signals; and
   an amplification means for amplifying one of said separated optical signals to produce an amplified optical signal and supplying said amplified optical signal to one of said input channels.

2. An active optical coupler as claimed in claim 1, wherein said amplification means comprises:
   a first photoelectric conversion means for converting said one of said separated optical signals to an electric signal;
   an amplifying means for amplifying said electric signal to produce an amplified electric signal; and
   a second photoelectric conversion means for converting said amplified electric signal to said amplified optical signal.

3. An active optical coupler as claimed in claim 2, wherein said amplification means is connected to one of said output channels which distributes one of said separated optical signals having the lowest power level of all of said output channels.

4. An active optical coupler as claimed in claim 1, wherein said multi channel coupler means comprises a pair of optical fibers having a first end portion, a second end portion, and a middle portion therebetween, said middle portions being mutually fusion bonded at a predetermined length so as to make said first end portions and said second end portions non bonded, said first end portions functioning as input channels.

5. An active optical coupler as claimed in claim 4, wherein said separation means separates said original optical signal at a predetermined distribution rate expressed by the ratio $r:1-r$, whereby $r$ is within the range of 0.5 to 0.518.

6. An active optical coupler as claimed in claim 4, wherein said multi channel coupler means further comprises another pair of said optical fibers which are fusion bonded with said pair of optical fibers at said middle portions so that said multi channel coupler means has $2^n$ of input channels and $2^n$ of output channels by fusion bonding n number of pairs of said optical fibers, whereby n is an integer.

7. An active optical coupler as claimed in claim 1, wherein said multi channel coupler means has at least two input channels and at least three output channels.

8. An active optical coupler as claimed in claim 1, wherein said multi channel coupler means has at least three input channels and at least two output channels.

9. An active optical coupler for use in an optical data link communication system, said coupler comprising:
   a multi-channel coupler means having a plurality of input channels for receiving an original optical signal, a separation means for separating said original optical signal into a predetermined number of separated optical signals, and a plurality of output channels for distributing said separated optical signals; and
   an amplification means for amplifying one of said separated optical signals to produce an amplified optical signal and supplying said amplified optical signal to one of said input channels,
   wherein said amplification means comprises:
   a first photoelectric conversion means for converting said one of said separated optical signals to an electric signal;
   an amplifying means for amplifying said electric signal to produce an amplified electric signal; and
   a second photoelectric conversion means for converting said amplified electric signal to said amplified optical signal, wherein said amplification means further comprises:
   an input control means connected between said first photoelectric conversion means and said amplifying means for controlling said electric signal to be within a voltage range at which said amplifying means linearly operates; and
   a driving means connected between said amplifying means and said second photoelectric conversion means for current amplification based on the input electric signal and driving said second photoelectric conversion means to produce said amplified optical signal.

* * * * *